(12) United States Patent
Harata et al.

(10) Patent No.: US 7,562,432 B2
(45) Date of Patent: Jul. 21, 2009

(54) METHOD FOR MANUFACTURING MAGNETOSTRICTIVE TORQUE SENSOR

(75) Inventors: Hitoshi Harata, Haga-machi (JP);
Nobuhiko Yoshimoto, Haga-machi (JP);
Tomohiro Hoshi, Haga-machi (JP);
Yukiya Kashimura, Haga-machi (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/582,971

(22) Filed: Oct. 19, 2006

(65) Prior Publication Data

US 2007/0089287 A1    Apr. 26, 2007

(30) Foreign Application Priority Data

Oct. 20, 2005    (JP) ............................ 2005-306134

(51) Int. Cl.
| | |
|---|---|
| G01R 31/28 | (2006.01) |
| H01C 17/28 | (2006.01) |
| H01F 7/06 | (2006.01) |
| H01F 1/00 | (2006.01) |
| H01F 21/06 | (2006.01) |
| G11B 5/127 | (2006.01) |
| G11B 5/33 | (2006.01) |
| H04R 31/00 | (2006.01) |
| G01L 3/00 | (2006.01) |

(52) U.S. Cl. .................. 29/593; 29/621.1; 29/602.1; 29/606; 29/603.23; 73/862.331; 73/862.332; 73/862.333; 148/121; 336/130; 336/131; 336/132; 360/313

(58) Field of Classification Search ............... 29/621.1, 29/602.1, 606, 603.23, 593; 336/130–132; 360/313; 148/121; 73/862.331–333; 324/252, 324/207
See application file for complete search history.

(56) References Cited

U.S. PATENT DOCUMENTS

| | | | | |
|---|---|---|---|---|
| 3,556,954 | A | * | 1/1971 | Luborsky .................. 205/90 |
| 4,236,946 | A | * | 12/1980 | Aboaf et al. ............... 148/108 |
| 4,908,932 | A | * | 3/1990 | Yagi et al. ................. 29/602.1 |
| 4,933,580 | A | * | 6/1990 | Ishino et al. ............... 310/26 |
| 5,201,964 | A | * | 4/1993 | Savage et al. ............. 148/108 |
| 5,203,929 | A | * | 4/1993 | Takayanagi et al. ....... 148/121 |
| 5,205,145 | A | * | 4/1993 | Ishino et al. .............. 72/53 |
| 5,574,231 | A | * | 11/1996 | Blomkvist et al. ..... 73/862.336 |
| 6,042,899 | A | * | 3/2000 | Ishiguro .................... 427/548 |
| 6,255,813 | B1 | * | 7/2001 | Isomura et al. ........... 324/249 |
| 6,490,934 | B2 | * | 12/2002 | Garshelis ............. 73/862.336 |
| 6,493,196 | B1 | * | 12/2002 | Noma et al. ........... 360/324.11 |
| 6,574,853 | B2 | * | 6/2003 | Shinoura ................. 29/602.1 |
| 6,607,641 | B2 | * | 8/2003 | Saito et al. ............. 204/192.2 |

(Continued)

FOREIGN PATENT DOCUMENTS

JP    2002-82000    *    3/2002

(Continued)

Primary Examiner—A. Dexter Tugbang
Assistant Examiner—David P Angwin
(74) Attorney, Agent, or Firm—Arent Fox LLP

(57) ABSTRACT

A method for manufacturing a magnetostrictive torque sensor having low nonuniformity of sensitivity characteristics. The residual austenite content in the rotating shaft of the torque sensor is measured first. A magnetic film is subsequently subjected to a heat treatment under heat treatment conditions that are different for each of the measured residual austenite contents, and magnetic anisotropy is imparted.

2 Claims, 9 Drawing Sheets

U.S. PATENT DOCUMENTS

| | | | |
|---|---|---|---|
| 6,701,793 B2 * | 3/2004 | Wallin et al. | 73/862.333 |
| 6,764,778 B2 * | 7/2004 | Saito et al. | 428/811.2 |
| 6,770,152 B1 * | 8/2004 | Okita et al. | 148/334 |
| 6,773,513 B2 * | 8/2004 | Ludtka | 148/108 |
| 6,808,824 B2 * | 10/2004 | Tanahashi et al. | 428/828.1 |
| 6,886,622 B2 * | 5/2005 | Villhard | 164/98 |
| 6,911,268 B2 * | 6/2005 | Takada et al. | 428/659 |
| 6,966,232 B2 * | 11/2005 | Asaumi et al. | 73/862.333 |
| 6,978,686 B2 * | 12/2005 | Shimizu et al. | 73/862.335 |
| 7,013,741 B2 * | 3/2006 | Nakamura et al. | 73/862.333 |
| 2005/0204830 A1 * | 9/2005 | Kuroda et al. | 73/862.331 |
| 2007/0089538 A1 * | 4/2007 | Kashimura et al. | 73/862.331 |
| 2007/0204703 A1 * | 9/2007 | Cripe | 73/862.08 |

FOREIGN PATENT DOCUMENTS

| | | |
|---|---|---|
| JP | 2002-082000 A | 3/2002 |

* cited by examiner

METHOD FOR MANUFACTURING MAGNETOSTRICTIVE TORQUE SENSOR

FIELD OF THE INVENTION

The present invention relates generally to a method for manufacturing a magnetostrictive torque sensor and, more particularly, to such a method having an improved process that eliminates nonuniformity in the magnetic characteristics of the material for a rotating shaft and keeps nonuniformity in the sensitivity characteristics of the sensor to a minimum.

BACKGROUND OF THE INVENTION

In an electric powered steering apparatus of an automobile, for example, a steering torque sensor senses a steering torque applied to a steering shaft by the driver using a steering wheel. A magnetostrictive torque sensor has recently been proposed as such a steering torque sensor. The steering shaft bears rotational force produced by steering operations, and functions as a rotating shaft. The steering shaft functions as part of the rotating shaft in the mounting location of the steering torque sensor. The electrically powered steering apparatus controls the driving of a steering force auxiliary motor according to a torque signal sensed by the steering torque sensor. The electrically powered steering apparatus reduces the steering force for the driver to provide a pleasant steering feel.

In the steering torque sensor of the electrically powered steering apparatus, magnetostrictive films that are magnetically anisotropic with respect to each other are formed at two specific locations on the surface of the steering shaft. The magnetostrictive torque sensor has a configuration in which a non-contact manner is used to detect changes in the magnetostrictive characteristics of the magnetostrictive films that correspond to the torsion of the steering shaft when torque is applied to the steering shaft from the steering wheel.

The method for manufacturing a magnetostrictive torque sensor comprises forming a magnetostrictive film over a specific surface in part of the steering shaft; i.e., over a circumferential surface having a specific axial width in the rotating shaft, and providing the magnetostrictive film with magnetic anisotropy. Conventional methods for providing the magnetostrictive film with magnetic anisotropy in the manufacture of a magnetostrictive torque sensor involve forming a magnetostrictive plating (magnetostrictive film) on a rotating shaft by electro-plating, for example, applying a twisting torque to the rotating shaft to create stress in the circumferential surface of the rotating shaft, and heat-treating the rotating shaft in a thermostat while the shaft is kept under stress (see JP-A-2002-82000, for example).

A magnetostrictive torque sensor for use as a steering torque sensor of an electrically powered steering apparatus is preferably one that is highly functional and has low nonuniformity in the sensor characteristics. In a magnetostrictive torque sensor, a structural steel that is inexpensive and has excellent strength and machining characteristics is used as the steering shaft on which a magnetostrictive film is formed.

SK, SCM, SNC, or other materials are used as the structural steel. These materials are magnetic materials, and include non-magnetic residual austenite as a component. In a steering shaft composed of structural steel, the residual austenite content is different depending on the heat-treatment conditions (hardening, tempering, and other conditions), composition, and other factors in the manufacturing stage. When the residual austenite content is different, the magnetic characteristics of the steering shaft change. In a method of manufacturing a common steering shaft, a steering shaft is ordinarily delivered containing residual austenite that has a content nonuniformity in a range of about 5 to 15%. Heat treatment is thereafter carried out in order to manufacture a magnetostrictive film on the steering shaft. It is known that, depending on the heat treatment, the heating state of the magnetostrictive film varies in accordance with the difference in the magnetic characteristics of the steering shaft, and the ultimate sensing characteristics of the sensor of the magnetostrictive torque sensor vary considerably. When the residual austenite content varies by 10%, for example, the ultimate sensing characteristics of the sensor vary by 10% or more.

As described above, the present inventors discovered that due to the difference in the residual austenite content of the steering shaft, temperature differences occur in the vicinity of the surface of the steering shaft even in cases in which the same heating conditions are maintained in the heating treatment performed when magnetic anisotropy is provided to the magnetostrictive film formed on the surface of the steering shaft. For this reason, nonuniformity in the sensitivity characteristics of the manufactured magnetostrictive torque sensor is produced when there is a difference in the residual austenite content.

Reducing the nonuniformity of residual austenite content in the steering shaft as such can be considered as a method of reducing nonuniformity in the sensitivity characteristics of a magnetostrictive torque sensor. However, a high level of technical difficulty is required to regulate the residual austenite content of the steering shaft on the order of several percent in the manufacturing stage. The cost of the steering shaft therefore becomes very high even if a steering shaft in which the residual austenite content is regulated were to be manufactured.

On the other hand, when a steering shaft in which the residual austenite content is different from the commonly used content, and a magnetostrictive torque sensor is manufactured in accordance with a conventional manufacturing method, the sensitivity characteristics of the magnetostrictive torque sensor thus manufactured become more nonuniform. For this reason, workers were required to adjust the sensitivity characteristics of the magnetostrictive torque sensor when the magnetostrictive torque sensor was mounted in the electrically powered steering apparatus. As a result, the process for assemblying the electrically powered steering apparatus was made more complicated, and the production costs of the apparatus were also increased.

When the sensitivity characteristics of the completed magnetostrictive torque sensor vary 10% or more, sensor production yield is reduced and adjustment of the characteristics in the assembly process becomes very difficult.

There is therefore a need for a method of manufacturing a magnetostrictive torque sensor that can reduce nonuniformity in the sensitivity characteristics of the sensor by ascertaining the residual austenite content, which is in a non-magnetic phase in a rotating shaft made of a magnetic material, and regulating the heat-treatment time and other parameters of the magnetic film. There is furthermore a need for a method of manufacturing a magnetostrictive torque sensor whereby the sensor production yield can be improved, the magnetostrictive torque sensor can be easily mounted at low cost, the assembly steps can be simplified overall, and the burden on workers can be improved.

SUMMARY OF THE INVENTION

According to the present invention, there is provided a method for manufacturing a magnetostrictive torque sensor, which comprises: measuring a residual austenite content of a rotating shaft of the magnetostrictive torque sensor, forming a magnetostrictive film on the rotating shaft, and imparting magnetic anisotropy to the magnetostrictive film on the basis of heat treatment conditions that correspond to measurement information obtained in the residual austenite content measuring.

In the manufacturing method described above, the residual austenite content of a steering shaft or another rotating shaft can be measured first. Heat treatment is then performed under heat treatment conditions that are different for each of the residual austenite contents of the rotating shaft in a state in which a prescribed twisting torque is applied to the base material of the magnetic film (magnetostrictive plating unit) in the magnetic anisotropy imparting process. Nonuniformity in the sensitivity characteristics of the magnetostrictive torque sensor can thereby be eliminated and uniform sensitivity characteristics can be obtained in the sensor even with a rotating shaft that has varying residual austenite contents and magnetic characteristics. The term "heat treatment conditions" is a broad concept that includes heat treatment time, heat output, and other parameters.

Preferably, the magnetic anisotropy imparting comprises a heat-treating the rotating shaft on the basis of a heat-treatment time that corresponds to the residual austenite content measured in the residual austenite content measuring in a state in which a prescribed twisting torque is applied.

Desirably, the residual austenite content measuring comprises disposing a sensing coil around the rotating shaft, supplying alternating current to the sensing coil to excite the sensing coil, indirectly measuring shaft impedance of the rotating shaft by means of the sensing coil, and calculating the residual austenite content based on the measured shaft impedance.

In the present invention, the residual austenite content of the rotating shaft used in the magnetostrictive torque sensor is measured by a non-destructive test when the magnetostrictive film is manufactured, the shafts are ranked based on the residual austenite content of the rotating shaft, different heat treatment conditions are set for each rotating shaft ranked in the step for imparting a magnetic anisotropy to the magnetostrictive film of the rotating shaft, and the shafts are heat-treated. For this reason, the use of expensive rotating shaft materials that originally have low residual austenite content is not required. In other words, a heat treatment can be carried out without changing the heat treatment apparatus, and non-uniformities in the sensitivity characteristics of the sensor can be reduced at low cost using conventional rotating shaft materials. Sensor production yield can thereby be improved, and the sensor can be provided with more-uniform sensitivity characteristics. Therefore, the magnetostrictive torque sensor can easily be assembled, the entire assembly step can be simplified, and the burden on the workers can be reduced.

BRIEF DESCRIPTION OF THE DRAWINGS

A preferred embodiment of the present invention will be described in detail below, by way of example only, with reference to the accompanying drawings, in which.

DETAILED DESCRIPTION OF THE PREFERRED EMBODIMENT

Figure 1:
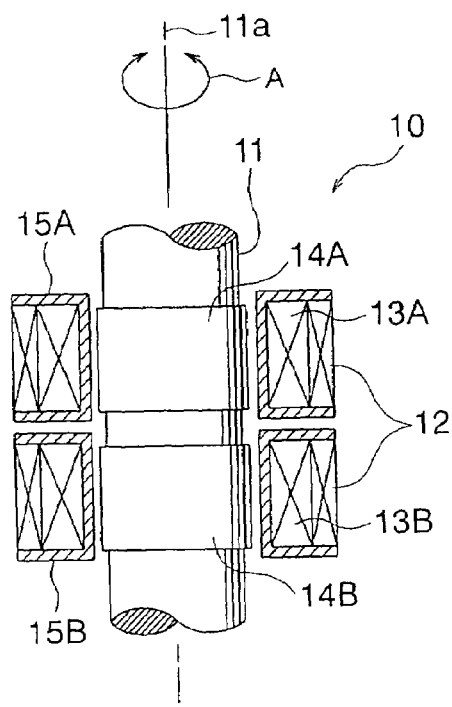
FIG. 1 is a partial cross-sectional side view showing a basic structure of a magnetostrictive torque sensor manufactured by the method for manufacturing a magnetostrictive torque sensor according to the present invention.
Figure 2:
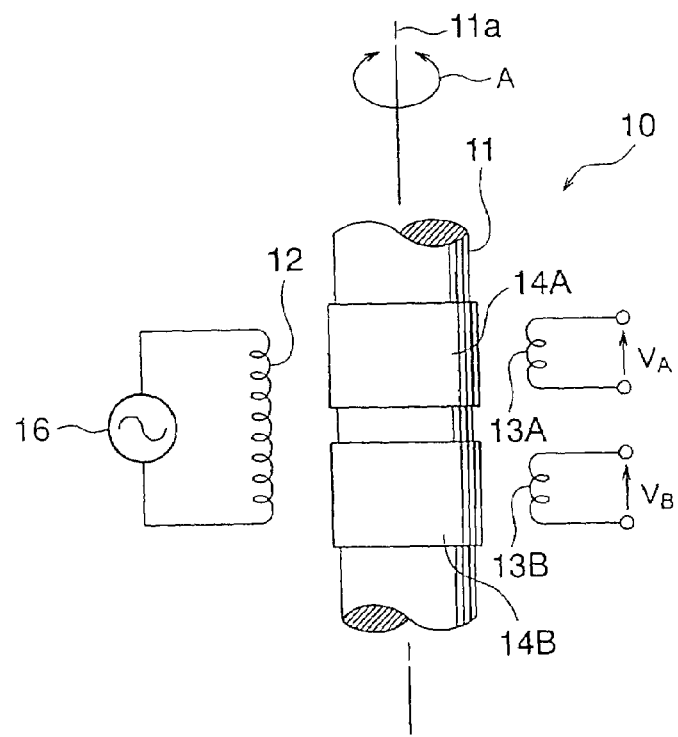
FIG. 2 is a side view schematically showing a basic configuration of the magnetostrictive torque sensor.
Figure 3:
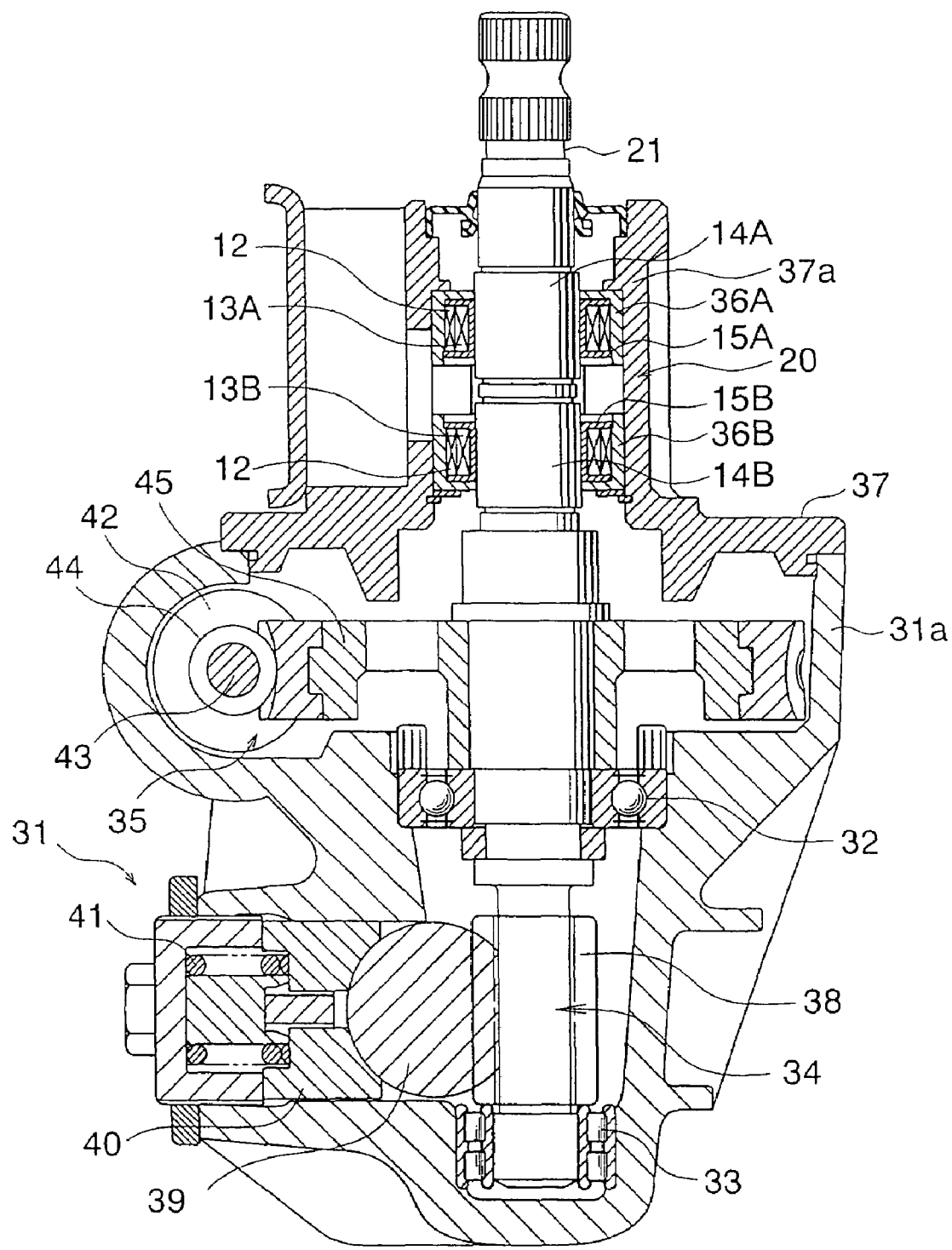
FIG. 3 is a fragmentary longitudinal cross-sectional view of a specific structure in which the magnetostrictive torque sensor is incorporated as a steering torque sensor into a steering shaft of an electrically powered steering apparatus.

A magnetostrictive torque sensor will be described first with reference to FIGS. 1 through 3. FIGS. 1 through 3 show a structural example of a magnetostrictive torque sensor manufactured by the method for manufacturing a magnetostrictive torque sensor according to the present invention.

A magnetostrictive torque sensor 10 is configured from a rotating shaft 11, and one excitation coil 12 and two sensor coils 13A and 13B disposed around the periphery of the rotating shaft 11, as shown in FIGS. 1 and 2. For the sake of convenience in the description, the rotating shaft 11 is shown without the top and bottom parts in FIGS. 1 and 2.

Referring to the example of utilization shown in FIG. 3, the rotating shaft 11 is configured as part of a steering shaft 21, for example. The rotating shaft 11 is subjected to the rotational force (torque) of right-hand rotation (clockwise) or left-hand rotation (counterclockwise) around the axial center 11a, as indicated by the arrow A. The rotating shaft 11 is formed from a metal rod made of chromium-molybdenum steel (SCM) or the like, for example. Magnetostrictive films 14A and 14B are provided to the rotating shaft 11 at two locations aligned vertically in the axial direction. The magnetostrictive films 14A and 14B both have specific widths in the axial direction of the rotating shaft 11, and also are formed over the entire circumferential periphery of the rotating shaft 11. The width dimension in the axial direction of the magnetostrictive films 14A and 14B and the dimension of the space between the two magnetostrictive films 14A and 14B are arbitrarily set in accordance with conditions. In practice, the magnetostrictive films 14A and 14B are formed on the surface of the rotating shaft 11 as magnetostrictive plating parts by an electroplating process or the like. The magnetostrictive films 14A and 14B, which are magnetically anisotropic, are formed by processing the magnetostrictive plating units so that magnetic anisotropy is obtained.

For the sake of convenience in the description below, the terms "magnetostrictive films 14A and 14B" and "magnetostrictive plating parts (14A and 14B)" denote the same items, but are used for different purposes depending on the steps and conditions of manufacturing. In principle, the completed products after magnetic anisotropy has been imparted are referred to as the "magnetostrictive films 14A and 14B," and prior to this step these parts are referred to as "magnetostrictive plating parts (14A and 14B)."

The excitation coil 12 and the sensor coils 13A and 13B are provided for both of the two magnetostrictive films 14A and 14B formed on the surface of the rotating shaft 11, as shown in FIG. 1. Specifically, the sensor coil 13A is disposed with an interposed gap from the periphery of the magnetostrictive film 14A, as shown in FIG. 1. The ring-shaped sensor coil 13A encircles the entire periphery of the magnetostrictive film 14A, and the axial width dimension of the sensor coil 13A is substantially equal to the axial width dimension of the magnetostrictive film 14A. Also, the sensor coil 13B is disposed with an interposed gap from the periphery of the magnetostrictive film 14B. The ring-shaped sensor coil 13B similarly encircles the entire periphery of the magnetostrictive film 14B, and the axial width dimension of the sensor coil 13B is substantially equal to the axial width dimension of the magnetostrictive film 14B. Furthermore, a ring-shaped excitation coil 12 is disposed around the peripheries of two sensor coils 13A and 13B. In FIG. 1, ring-shaped excitation coils 12 are illustrated as being provided separately to the magnetostrictive films 14A and 14B, but this is a depiction of two portions of what is actually one excitation coil 12. The sensor coils 13A and 13B and the excitation coil 12 are wound in the peripheral space around the magnetostrictive films 14A and 14B by using ring-shaped supporting frames 15A and 15B that are provided to the periphery of the rotating shaft 11 so as to encircle the rotating shaft 11.

In FIG. 2, the excitation coil 12 and the sensor coils 13A and 13B are schematically shown in terms of their electrical relationship to the magnetostrictive films 14A and 14B of the rotating shaft 11. An alternating-current power source 16 that constantly supplies an AC excitation current is connected to the excitation coil 12 shared by the magnetostrictive films 14A and 14B. Also, induced voltages $V_A$ and $V_B$ corresponding to the torque to be detected are outputted from the output terminals of the sensor coils 13A and 13B provided to the magnetostrictive films 14A and 14B, respectively.

The magnetostrictive torque sensor 10 is incorporated as a steering torque sensor into the steering shaft of an electrically powered steering apparatus, for example, as shown in FIG. 3. Elements in FIG. 3 that are substantially identical to those described in FIGS. 1 and 2 are denoted by the same numerical symbols. FIG. 3 shows the configuration of a steering torque sensor 20, a supporting structure for a steering shaft 21 (corresponding to the rotating shaft 11), a rack-and-pinion mechanism 34, a drive force transmission mechanism 35, and a steering force auxiliary motor 42.

In FIG. 3, the top of the steering shaft 21 is joined to the steering wheel (not shown) of the vehicle. The bottom of the steering shaft 21 is configured so as to transmit steering force to a vehicle shaft comprising a rack shaft, via the rack-and-pinion mechanism 34. The steering torque sensor 20 provided at the top of the steering shaft 21 is configured using the magnetostrictive torque sensor 10. The steering torque sensor 20 corresponds to the magnetostrictive torque sensor 10, and the portion of the steering shaft 21 on which the magnetostrictive films 14A and 14B are formed corresponds to the rotating shaft 11.

The steering shaft 21 is rotatably supported by two shaft bearings 32 and 33 in a housing 31a that forms a gearbox 31. The rack-and-pinion mechanism 34 and the drive force transmission mechanism 35 are accommodated inside the housing 31a.

The steering torque sensor 20 (magnetostrictive torque sensor 10) is provided to the steering shaft 21. The previously described magnetostrictive films 14A and 14B are formed on the steering shaft 21, and the excitation coil 12 and sensor coils 13A and 13B corresponding to the magnetostrictive films 14A and 14B are supported by the supporting frames 15A and 15B and yokes 36A and 36B.

The top opening of the housing 31a is closed by a lid 37. A pinion 38 provided at the bottom end of the steering shaft 21 is positioned between the shaft bearings 32 and 33. A rack shaft 39 is guided by a rack guide 40 and is urged by a compressed spring 41 to press against the side of the pinion 38. The drive force transmission mechanism 35 is formed by a worm gear 44 fixed on a transmission shaft 43 that is joined to the output shaft of the steering force auxiliary motor 42, and also a worm wheel 45 fixed on the steering shaft 21. The steering torque sensor 20 is attached to the interior of a cylindrical part 37a of the lid 37.

The steering torque sensor 20 senses the steering torque applied to the steering shaft 21. The sensed value is inputted to a control apparatus (not shown) and is used as a reference signal for generating a suitable auxiliary steering torque in an electric motor 42. When the steering torque from the steering wheel is applied to the steering shaft 21, the steering torque sensor 20 electrically senses changes in the magnetic characteristics of the magnetostrictive films 14A and 14B that correspond to the torsion in the steering shaft 21. The changes are sensed as changes in the induced voltages $V_A$ and $V_B$ from the output terminals of the sensor coils 13A and 13B.

Torsion occurs in the steering shaft 21 when steering torque acts on the steering shaft 21. As a result, a magnetostrictive effect is created in the magnetostrictive films 14A and 14B. Since an excitation electric current is constantly supplied to the excitation coil 12 from the AC power source 16 in the steering torque sensor 20, the change in the magnetic field resulting from the magnetostrictive effect in the magnetostrictive films 14A and 14B is detected by the sensor coils 13A and 13B as a change in the induced voltages $V_A$ and $V_B$. According to the steering torque sensor 20, the difference between the two induced voltages $V_A$ and $V_B$ is outputted as a detected voltage value on the basis of the change in the induced voltages $V_A$ and $V_B$. Therefore, the direction and extent of the steering torque (T) applied to the steering shaft 21 can be sensed based on the outputted voltage $(V_A - V_B)$ of the steering torque sensor 20.

Figure 4:
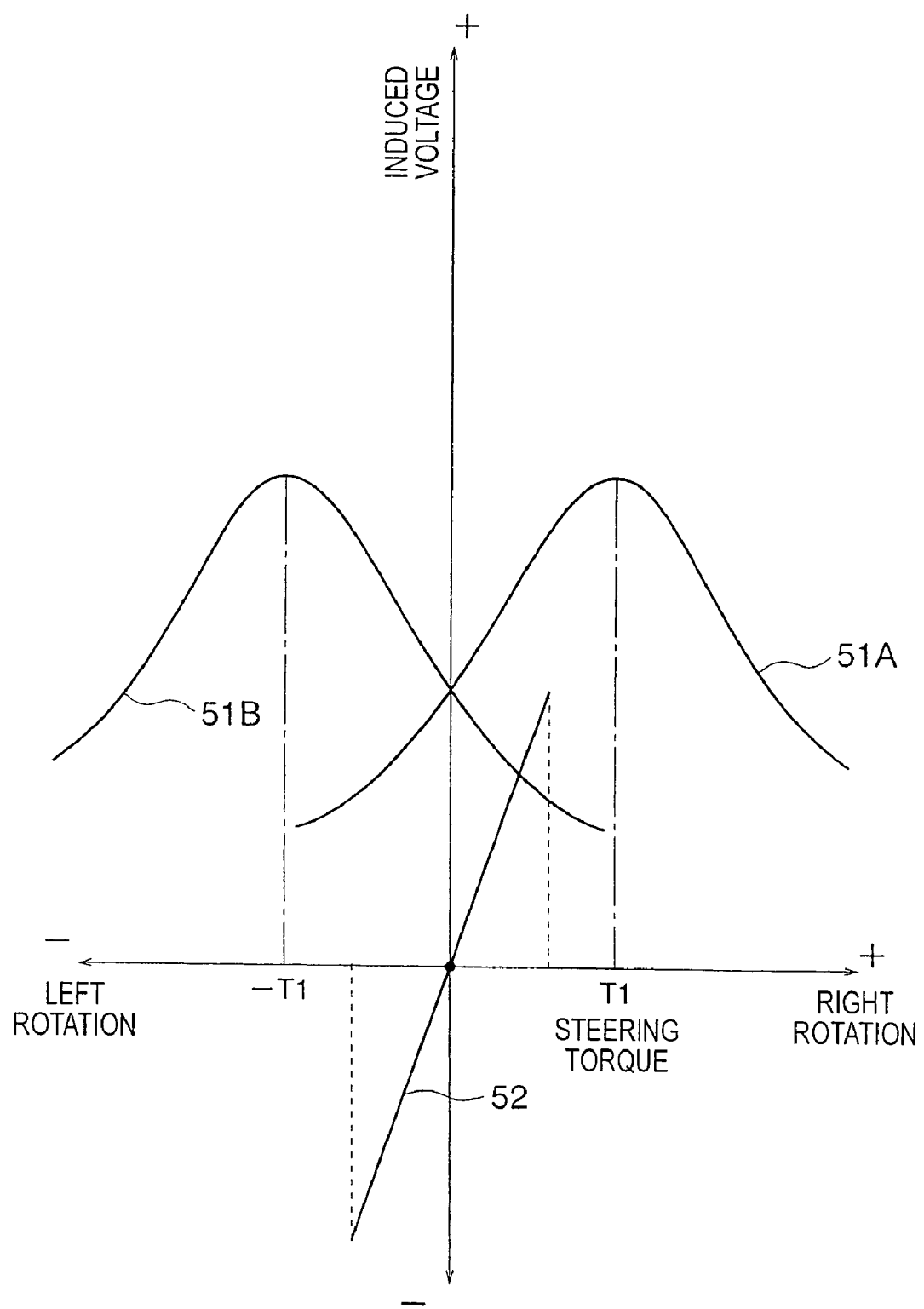
FIG. 4 is a graph showing the magnetostrictive characteristic curves and sensor characteristics of sensor coils in a magnetostrictive torque sensor.

FIG. 4 show the magnetostrictive characteristics curves 51A and 51B of the two magnetostrictive films 14A and 14B, respectively. In FIG. 4, the horizontal axis represents the steering torque applied to the steering shaft 21, wherein the positive side (+) corresponds to right-hand rotation, while the negative side (−) corresponds to left-hand rotation. The vertical axis in FIG. 4 represents a voltage axis.

The magnetostrictive characteristic curves 51A and 51B for the magnetostrictive films 14A and 14B simultaneously show the detection output characteristics of the sensor coils 13A and 13B. Specifically, an excitation AC current is supplied by the shared excitation coil 12 to the magnetostrictive films 14A and 14B that have the magnetostrictive characteristic curves 51A and 51B, and the sensor coils 13A and 13B respond to this excitation AC current by outputting induced voltages. Therefore, the changing characteristics of the induced voltages of the sensor coils 13A and 13B correspond to the magnetostrictive characteristic curves 51A and 51B of the magnetostrictive films 14A and 14B. In other words, the magnetostrictive characteristic curve 51A shows the changing characteristics of the induced voltage $V_A$ outputted from the sensor coil 13A, while the magnetostrictive characteristic curve 51B shows the changing characteristics of the induced voltage $V_B$ outputted from the sensor coil 13B.

According to the magnetostrictive characteristic curve 51A, the value of the induced voltage $V_A$ outputted from the sensor coil 13A increases in a substantially linear fashion as the value of the steering torque changes from negative to positive and approaches the positive steering torque value T1, then peaks when the steering torque reaches the positive value T1, and gradually decreases as the steering torque increases past T1. According to the magnetostrictive characteristic curve 51B, the value of the induced voltage $V_B$ outputted from the sensor coil 13B gradually increases as the value of the steering torque approaches the negative value −T1, then peaks when the steering torque reaches the negative value −T1, and decreases in substantially linear fashion as the steering torque further increases past −T1 and changes from negative to positive.

As shown in FIG. 4, the magnetostrictive characteristic curve 51A pertaining to the sensor coil 13A and the magnetostrictive characteristic curve 51B pertaining to the sensor coil 13B reflect that the magnetostrictive films 14A and 14B are inversely magnetically anisotropic to each other, and have a relationship of substantially linear symmetry about the vertical axis that includes the point where the two magnetostrictive characteristic curves intersect.

The line 52 shown in FIG. 4 indicates a graph that is created based on values obtained in a region that is common to the magnetostrictive characteristic curves 51A and 51B and that has substantially linear characteristics. The values of this line are obtained by subtracting the corresponding values of the magnetostrictive characteristic curve 51B obtained as output voltages of the sensor coil 13B from the values of the magnetostrictive characteristic curve 51A obtained as output voltages of the sensor coil 13A. When the steering torque is zero, the induced voltages outputted from the sensor coils 13A and 13B are equal, and their difference is therefore zero. In the steering torque sensor 20, the line 52 is formed as being a substantially straight line by using the region in the magnetostrictive characteristic curves 51A and 51B that is considered to have a substantially constant slope near the mean point (zero) of the steering torque. The vertical axis in FIG. 4 represents an axis that indicates a voltage difference value for the characteristic graph of the line 52. The line 52, which is a characteristic graph, is a straight line that passes through the origin (0, 0) and lies on the positive and negative sides of both the vertical and horizontal axes. Since the detection output values of the steering torque sensor 20 are obtained as the difference $(V_A-V_B)$ between induced voltages outputted from the sensor coils 13A and 13B as previously described, the direction and extent of the steering torque applied to the steering shaft 21 can be detected based on the use of the straight line 52.

As described above, it is possible to obtain a sensor signal that corresponds to the rotational direction and extent of the steering torque inputted to the steering shaft 21 (rotating shaft 11). The signal is obtained based on the output values of the steering torque sensor 20. Specifically, the rotational direction and extent of the steering torque applied to the steering shaft 21 can be known from the sensor values outputted from the steering torque sensor 20.

In other words, the sensor values of the steering torque sensor 20 are outputted as any of the points on the vertical line 52 in accordance with the steering torque. The steering torque is determined to be rotating to the right when the sensor value is on the positive side of the horizontal axis, and the steering torque is determined to be rotating to the left when the sensor value is on the negative side of the horizontal axis. The absolute value of the sensor value on the vertical axis is the extent of the steering torque. Thus, it is possible to sense the steering torque by the steering torque sensor 20 on the basis of the output voltage values of the sensor coils 13A and 13B by using the characteristics of the vertical line 52.

Figure 5:
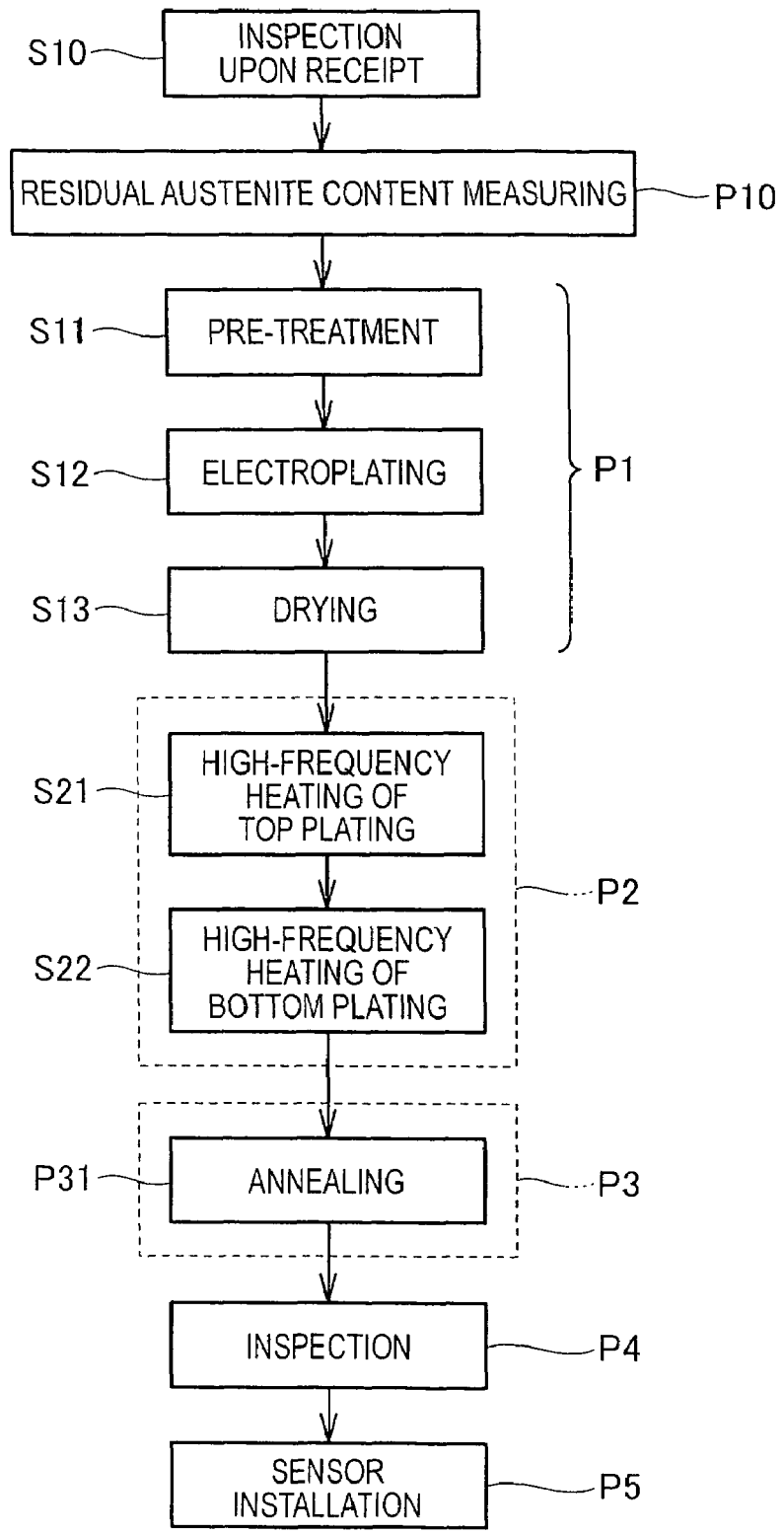
FIG. 5 is a flow diagram showing a process for manufacturing a rotating shaft as part of the method for manufacturing a magnetostrictive torque sensor according to the present invention.

The following is a description, made with reference to FIGS. 5 through 14, of the method for manufacturing the magnetostrictive torque sensor 10 previously described. The main part of the method for manufacturing the magnetostrictive torque sensor 10 in FIG. 5 shows the steps for manufacturing the rotating shaft 11 of the magnetostrictive torque sensor 10, i.e., the steering shaft 21. FIG. 5 primarily shows all the steps for manufacturing the rotating shaft 11.

In FIG. 5, broadly classified, the process for manufacturing the rotating shaft 11 comprises a magnetostrictive film formation process P1, a magnetic anisotropy imparting process P2, a characteristic stabilization process P3, a testing process P4, and a residual austenite content measuring process P10, which is the characteristic step. The residual austenite content measuring process P10 is performed before the magnetostrictive film formation process P1. In the heating step, in which the rotating shaft 11 is heat-treated in the magnetic anisotropy imparting process P2, the heat treatment time is varied in accordance with the rank of the rotating shaft 11. This is because the residual austenite content measuring process P10 is provided as described below.

The characteristic stabilization process P3 ordinarily includes an annealing process P31. A sensor mounting process P5 for mounting excitation coils 12, sensor coils 13A and 13B, or other such sensors is provided after the testing process P4 in order to complete the magnetostrictive torque sensor 10.

The magnetostrictive film formation process P1 is a step for forming a magnetostrictive film on the delivered rotating shaft 11 (steering shaft 21). In the present example, a residual austenite content measuring process P10 is provided as described above as a step that precedes the magnetostrictive film formation process P1. In practice, the delivered rotating shaft 11 is inspected upon receipt (step S10), prior to the residual austenite content measuring process P10.

Described first are the magnetostrictive film formation process P1, the magnetic anisotropy imparting process P2, the characteristic stabilization process P3, and the testing process P4.

In the magnetostrictive film formation process P1, magnetostrictive plating parts are formed by electroplating as base portions for the magnetostrictive films at specific locations on the surface of the rotating shaft 11. In the magnetostrictive film formation process P1, washing or another such preparatory process or pre-treatment is first performed on the rotating shaft 11 (step S11). Electroplating is then performed (step S12). This electroplating is performed so that the magnetostrictive material is deposited to a specific thickness at the top and bottom locations on the rotating shaft 11. The upper and lower magnetostrictive plating parts are portions that are used to form magnetically anisotropic magnetostrictive films 14A and 14B by an aftertreatment to be described later. Drying is then performed (step S13).

In the magnetostrictive film formation process P1, an electroplating method was used to form the previously described magnetostrictive films 14A and 14B on the surface of the rotating shaft 11. However, the base portions that form the magnetostrictive films 14A and 14B on the rotating shaft 11 can also be formed by methods other than electroplating, such as sputtering, ion plating, or another such PVD method; plasma spraying; or the like.

Next, the magnetic anisotropy formation process P2 is performed. The magnetic anisotropy formation process P2 is a step for imparting magnetic anisotropy to the magnetostrictive plating parts formed at the two top and bottom locations on the rotating shaft 11, thus forming the previously described magnetostrictive films 14A and 14B. The magnetic anisotropy formation process P2 has a step S21 of high-frequency heating performed on the top magnetostrictive plating part, and a step S22 of high-frequency heating performed on the bottom magnetostrictive plating part.

Figure 6:
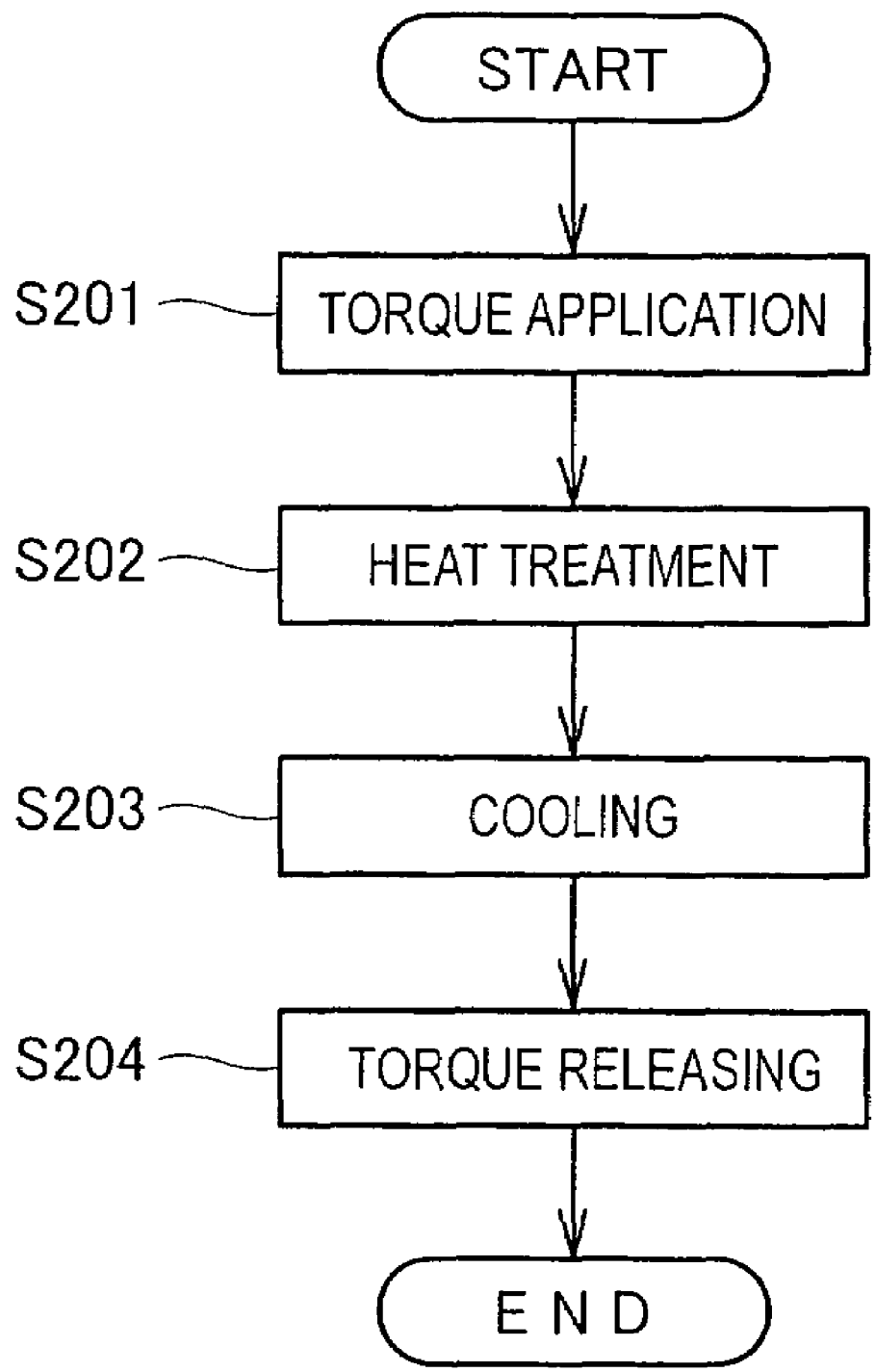
FIG. 6 is a flowchart of the magnetic anisotropy imparting process.

FIG. 6 shows a flowchart of the processing steps performed in steps S21 and S22 in the magnetic anisotropy formation process P2.

Step S21 will be described wherein the top magnetostrictive plating part in the magnetic anisotropy formation process P2 is heated at a high frequency. In step S21, step S201 is performed first to apply a specific twisting torque to the rotating shaft 11 via a torque application device. A heating step S202 is performed next to heat the top magnetostrictive plating part of the rotating shaft 11 by magnetic induction, wherein high frequency waves are supplied for a specific amount of time while the specific twisting torque is being applied. Step S203 is performed next to naturally cool the heated rotating shaft 11, and the torque releasing step S204 is lastly performed to impart magnetic anisotropy in the top magnetostrictive plating part by releasing the twisting torque, thus forming the magnetostrictive film 14A.

In the heating step S202, an induction heating coil is placed on the top magnetostrictive plating part of the rotating shaft 11, and a specific high-frequency electric current is supplied from a high-frequency power source to the induction heating coil to perform high-frequency heating on only the top magnetostrictive plating part.

Magnetic anisotropy is imparted to the top magnetostrictive plating part of the rotating shaft 11 in steps S201 through S204, whereby a magnetically anisotropic magnetostrictive film 14A is formed.

The steps S201 through S204 are similarly performed in the high-frequency heating step S22 for the bottom magnetostrictive plating part of the rotating shaft 11, imparting magnetic anisotropy to the bottom magnetostrictive plating part, whereby a magnetically anisotropic magnetostrictive film 14B is formed. In this case, magnetic anisotropy is imparted to the bottom magnetostrictive plating part, whereupon the direction in which torque is applied to the rotating shaft 11 is reversed so as to achieve inverse magnetic anisotropy in the magnetostrictive film 14B.

In the magnetic anisotropy imparting process P2, the heat treatment conditions (heat treatment time, and other parameters) in the heating step S202 in which heat treatment is carried out are controlled so as to vary in accordance with the rank of each rotating shaft 11, which are ranked in accordance with the residual austenite content of the rotating shaft 11, as described hereinafter.

The characteristic stabilization process P3 is performed after the magnetic anisotropy imparting process P2 described above. In the characteristic stabilization process P3, an annealing process P31 is performed and heat treatment is carried out for a specific length of time at a temperature that is the service temperature or greater in conditions in which the steering torque sensor 20 is used, for example.

The testing process P4 is performed after the characteristic stabilization process P3. A sensor mounting process P5 for mounting excitation coils 12 or other sensors is performed thereafter, and testing means are provided for testing changes in the magnetostrictive characteristics in the periphery of the magnetostrictive films 14A and 14B of the rotating shaft 11. The magnetostrictive torque sensor 10 is completed by way of the above-described steps.

Described next in detail are the measuring method and the reason for implementing the residual austenite content measuring process P10 described above.

The reason for implementing the residual austenite content measuring process P10 is described first.

Chromium molybdenum steel (SCM material), nickel chromium molybdenum steel (SNCM material), or another structural steel is used as the rotating shaft 11 (steering shaft 21) of the magnetostrictive torque sensor. As described above, in the rotating shaft 11, the magnetic characteristics of the rotating shaft as such vary depending on the residual austenite content at the time the rotating shaft is manufactured. Ordinarily, the delivered rotating shaft 11 has a residual austenite content of about 5 to 15%, depending on the hardening temperature, tempering temperature, Cp (carbon potential) value, composition, and other factors. The delivered rotating shaft 11 has different residual austenite contents depending on the maker and production lot. When such a rotating shaft 11 is subjected to the same heat treatment conditions in the execution the heating step S202 in magnetic anisotropy imparting process P2, considerable nonuniformity is generated in the sensor characteristics (center point characteristics, sensitivity characteristics) of the ultimately-manufactured magnetostrictive torque sensor.

In view of the above and in accordance with the method of manufacturing according to the present example, each delivered rotating shaft 11 is measured in a non-contact manner for the residual austenite content of each of the rotating shaft 11 in the residual austenite content measuring process P10. Each of the delivered rotating shafts 11 is ranked (or classified) in accordance with the residual austenite content obtained by the measurement. In the heating step S202 in the magnetic anisotropy imparting process P2 described above, the heat treatment conditions (hereinafter referred to as "heat treatment time") are varied for each rank and the heat treatment time is controlled for each of the rotating shafts 11 ranked based on the residual austenite content.

In the heating step S202 of the magnetic anisotropy imparting process P2, nonuniformities in the heat treatment state and the sensitivity characteristics of the sensor are reduced by controlling the heat treatment time in accordance with the rank of each of the rotating shafts 11. The quality and productivity in the manufacturing process of the magnetostrictive torque sensor 10 can thereby be improved. Specifying a fixed residual austenite content on the order of several percent during delivery of the rotating shafts 11 is very difficult, and specifying such a value increases costs. The residual austenite content of the shafts is preferably kept within a certain range in order to reduce manufacturing costs.

Described next is the measuring method in the residual austenite content measuring process P10.

In the magnetostrictive film formation process P10, each rotating shaft 11 is subjected to a non-destructive test using a coil (hereinafter referred to as "sensing coil") to measure the residual austenite content of the rotating shaft 11. Specifically, in the present example, the rotating shaft 11 is insertably mounted through the center of a sensing coil to dispose the sensing coil at the periphery of the rotating shaft 11, the AC current is fed to the sensing coil to excite the coil, and the shaft impedance of the rotating shaft 11 is indirectly measured using the sensing coil by measuring the impedance between the coil terminals. The magnetic state of the rotating shaft 11 is determined based on the measured shaft impedance value of the rotating shaft 11, and the residual austenite content is calculated based on the impedance value. As used herein, the term "shaft impedance" of the rotating shaft 11 refers to a characteristic value that represents the magnetic characteristics of the rotating shaft 11. The value is measured and indirectly calculated as the coil impedance of the sensing coil.

The step for measuring the shaft impedance of the rotating shaft 11 is preferably performed prior to imparting magnetic anisotropy to the magnetostrictive film of the rotating shaft 11 by induction heating using high-frequency waves. The step is even more preferably carried out prior to providing the rotating shaft 11 with a magnetostrictive plating part, which is the base material of the magnetostrictive films 14A and 14B.

Figure 7A:
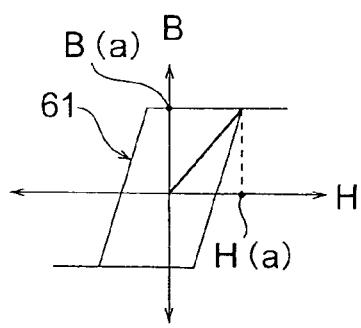
FIGS. 7A and 7B are graphs showing magnetic characteristics that depend on whether the residual austenite content of the rotating shaft is high or low.
Figure 7B:
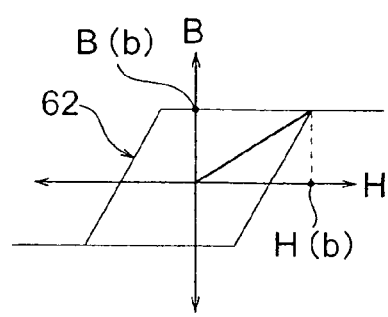

FIGS. 7A and 7B are graphs showing the relationship between the magnetic characteristics and the residual austenite content in the rotating shaft 11. In FIGS. 7A and 7B, the horizontal axis represents the magnetic field (H) and the vertical axis represents the magnetic flux density (B). When the rotating shaft 11 has a low residual austenite content, it has a narrow hysteresis curve characteristic 61 in the direction of the magnetic field, as shown in FIG. 7A. When the rotating shaft 11 has a high residual austenite content, it has a broad hysteresis curve characteristic 62 in the direction of the magnetic field, as shown in FIG. 7B. A comparison of the hysteresis curve characteristics 61 and 62 shows that the magnetic permeability $\mu$ of the rotating shaft 11 increases as the residual austenite content of the rotating shaft 11 decreases in any magnetic field H, because the magnetic permeability $\mu$ is calculated as B/H. In other words, the magnetic permeability $\mu(a)$ on the hysteresis curve characteristic 61 is calculated as $B(a)/H(a)$, and the magnetic permeability $\mu(b)$ on the hysteresis curve characteristic 62 is calculated as $B(b)/H(b)$, resulting in the inequality $\mu(a)>\mu(b)$. Therefore, the residual austenite content of the rotating shaft 11 can be determined by measuring an electric quantity dependent on the magnetic permeability $\mu$.

In view of the above, in the method of measuring the residual austenite content of the rotating shaft 11 according to the present example, a sensing coil is disposed at the periphery of the rotating shaft 11 as described above, the impedance (Z) of the rotating shaft 11 is measured using the sensing coil, and the residual austenite content of the rotating shaft 11 is determined by the magnitude (|Z|) of the shaft impedance (Z). Specifically, the shaft impedance (Z) is expressed by Eq. (1) noted below. Eq. (1) is dependent on the magnetic permeability $\mu$, and the magnetic permeability $\mu$ depends on and varies with the residual austenite content. Therefore, the relationship between the shaft impedance (Z) and residual austenite content can be calculated as follows.

$$|Z|=\sqrt{((\omega L)^2+R^2)} \quad (1)$$

In Eq. (1), $\omega$ is the angular frequency of the alternating current fed to the sensing coil, L is the impedance, and R is the resistance. The impedance L is correlated with the magnetic permeability $\mu$ as shown by Eq. (2).

$$L=\mu(K \cdot n^2 \cdot S)/I \quad (2)$$

In Eq. (2), K is the Nagaoka coefficient, n is the turn factor of the excitation coil, S is the cross-sectional area of the excitation coil, and I is the length of the sensing coil in the axial direction.

In the present example, the correlation between the shaft impedance (Z) and residual austenite content of the rotating shaft 11 is computed in advance by X-ray diffraction. A table in which the shaft impedance values corresponding to the residual austenite contents is thereby created in advance, for example.

TABLE 1 below shows a ranking of rotating shafts 11 and residual austenite contents obtained by the X-ray diffraction method in relation to the shaft impedance (Z) of each of the rotating shafts 11.

TABLE 1

| C1 NO. | C2 Z 100 KHZ | C3 Z 30 KHZ | C4 $\gamma$ | C5 $\alpha$ | C6 Ratio | C7 Residual austenite content | C8 Rank |
|---|---|---|---|---|---|---|---|
| S1 | 816.95 | 366.39 | 622 | 13209 | 4.71% | 4.82% | 6 |
| S2 | 809.82 | 364.26 | 636 | 13799 | 4.61% | 4.72% | 6 |
| S3 | 806.76 | 362.78 | 830 | 15044 | 5.52% | 5.65% | 5 |
| S4 | 801.21 | 358.95 | 806 | 14033 | 5.74% | 5.88% | 4 |
| S5 | 791.93 | 357.51 | 1042 | 13290 | 7.84% | 8.03% | 3 |
| S6 | 786.29 | 348.36 | 1184 | 12479 | 9.49% | 9.71% | 0 |

In TABLE 1, column C1 shows the samples (S1 to S6) of the rotating shafts 11, column C2 shows the shaft impedances (Z) of the rotating shafts 11 measured by feeding an AC current of 100 KHz, and column C3 shows the shaft impedances (Z) of the rotating shafts 11 measured by feeding an AC current of 30 KHz. The measurement examples of six rotating shafts 11 (samples S1 to S6) are shown as examples in TABLE 1. The integrated intensities $\gamma$ in column C4 show the integrated intensities of the diffraction lines produced by the X-ray diffraction of residual austenite in the rotating shafts 11, and the integrated intensities $\alpha$ in column C5 show the integrated intensities of the diffraction lines produced by the X-ray diffraction of martensite in the rotating shafts 11. The ratios in column C6 are calculated based on Eq. (3) noted below, wherein I$\gamma$ is the numerical value of the integrated intensity $\gamma$, and I$\alpha$ is the numerical value of the integrated intensity $\alpha$. In Eq. (3), c$\gamma$ is the volume ratio of austenite, c$\alpha$ is the volume ratio of martensite, and R$\gamma$ and R$\alpha$ are constants that depend on the type of material that is used. Also, R depends on the angle $\theta$ of the diffraction beam and the Miller indices hkl of the crystal surface.

$$I\gamma/I\alpha=(R\gamma/R\alpha)(c\gamma/c\alpha) \quad (3)$$

Specifically, the ratios in column C6 are the ratios (c$\gamma$/c$\alpha$) calculated based on Eq. (3). The residual austenite of column C7 shows the values of c$\gamma$ calculated using the relation c$\gamma$+c$\alpha$=1.

All of the rotating shaft 11 samples (S1 to S6) are excited with alternating current using the sensing coil, the impedance values of the rotating shafts 11 are measured, the residual austenite contents of the rotating shafts 11 are calculated based on the measurements, and the rotating shafts 11 are ranked in accordance with the ranking table described hereinafter on the basis of the shaft impedance values (or the residual austenite contents). Specifically, in column C8 of TABLE 1, one of any of seven ranks on a scale of 0 to 6 is displayed for each of the rotating shafts 11 for the samples S1 to S6.

The ranking table is described below. An example of a ranking table is shown in TABLE 2 noted below. In TABLE 2, the ranks 0 to 6 are shown in column C1, and the ranges (upper and lower limit values) of shaft impedances corresponding to the ranks are shown in column C12. Column 12a shows the lower limit values of the shaft impedance values, and column 12b shows the upper limit values of the shaft impedance values. The shaft impedance values shown in column C12 are based on shaft impedance values produced by an alternating current of 30 KHz. The ranking may be based on shaft impedance values produced at 100 KHz rather than the shaft impedance values produced at 30 KHz.

TABLE 2

| C11 Rank | C12 | |
|---|---|---|
| | C12a greater than | C12b less than |
| 0 | | 349.00 |
| 1 | 349.00 | 352.00 |
| 2 | 352.00 | 355.00 |
| 3 | 355.00 | 358.00 |
| 4 | 358.00 | 361.00 |
| 5 | 361.00 | 364.00 |
| 6 | 364.00 | |

The rotating shafts 11 of the samples S1 to S6 are ranked from 0 to 6 as shown in column C8 of TABLE 1, on the basis of TABLE 2 noted above.

Figure 8:
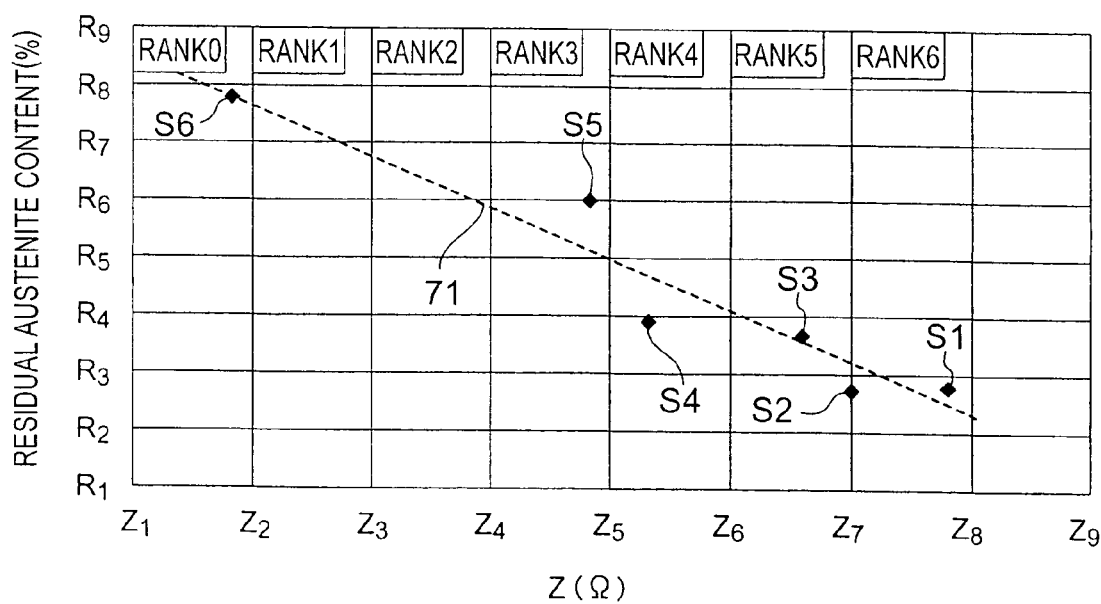
FIG. 8 is a graph showing the relationship between the residual austenite content (%) and the shaft impedance (Z) of the rotating shaft.

FIG. 8 shown the rankings indicated in column C8 of TABLE 1. In FIG. 8, the Horizontal axis represents the shaft impedance (Z) of the rotating shafts 11 shown in column C3 of TABLE 1, and the vertical axis represents the residual austenite content (cγ) shown in column C7 of TABLE 1. The six plotted dots in the graph of FIG. 8 represent the samples S1 to S6 listed in column C1 of TABLE 1. The broken straight line 71 is the straight line obtained from the data of the plotted sample S1 to S6 using the method of least squares.

As shown in FIG. 8, when the ranks of the rotating shafts 11 differ in accordance with the residual austenite content in relation to the rotating shafts 11 of the materials S1 to S6, the midpoint of the sensitivity and the sensitivity as such undergo variation in the ultimately completed magnetostrictive torque sensor, and nonuniformities occur in the sensitivity characteristics, assuming that the heat treatment time in the heating step S202 of the subsequently performed magnetic anisotropy imparting process P2 is fixed without regard to the rank.

Figure 9:
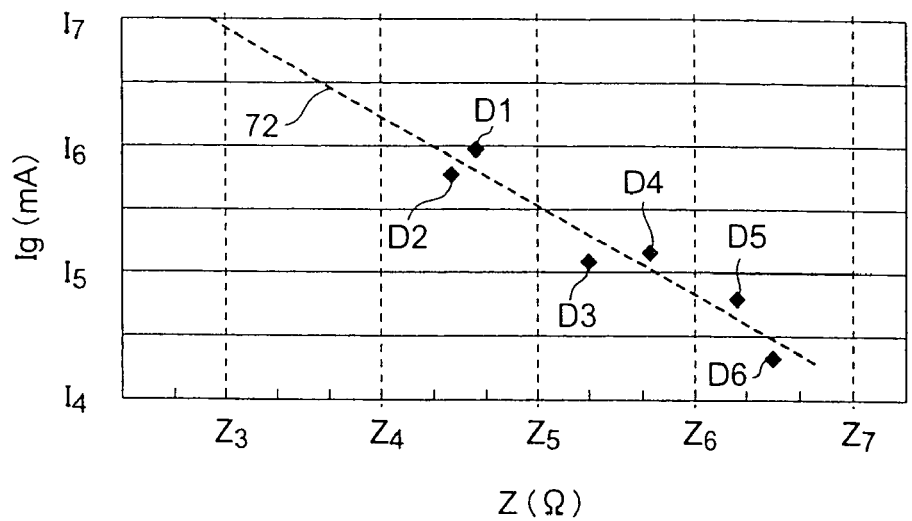
FIG. 9 is a graph of the relationship between the shaft impedance (Z) of the rotating shaft and the grid current (Ig) when the magnetostrictive plating unit is heated.
Figure 10:
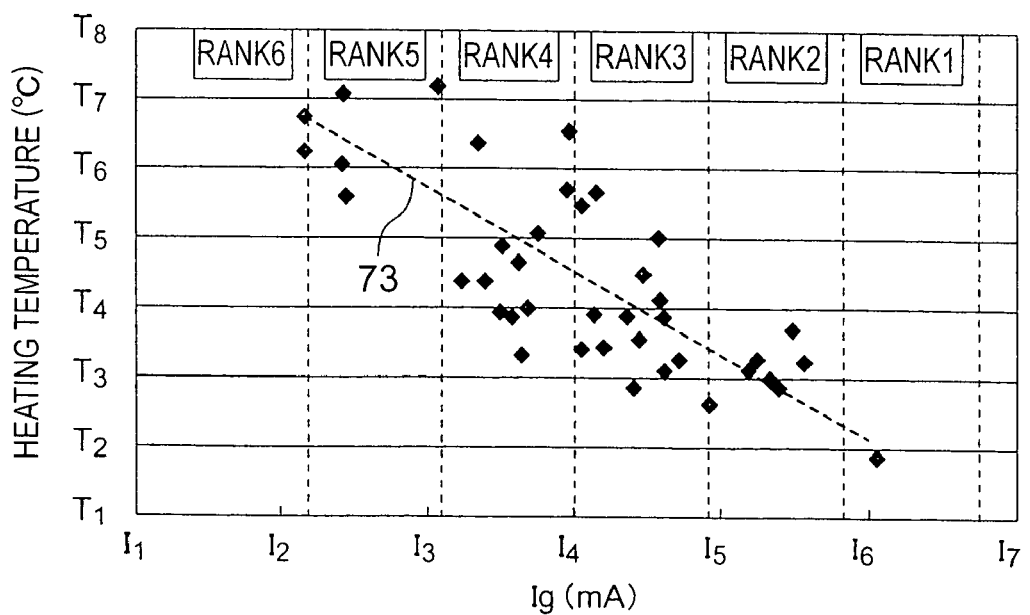
FIG. 10 is a graph showing the relationship between the grid current (Ig) and the heating temperature when the magnetostrictive plating unit is heated.

Described next with reference to FIGS. 9 to 11 is the reason that non-uniformities uniformities occur in the sensitivity characteristics of the magnetostrictive torque sensor when the heat treatment times in the heating step 202 are the same while the residual austenite contents of the rotating shafts 11 are different, i.e., the ranks of the rotating shafts 11 are different.

FIG. 9 is a graph showing the relationship between the shaft impedance of a rotating shaft 11 and the grid current Ig when the magnetostrictive plating part (magnetostrictive films 14A and 14B) of the rotating shaft 11 is heated. As used herein, the term "grid current Ig" refers to the electric current that is inversely proportional to the eddy current generated in the magnetostrictive plating part and the rotating shaft 11 when a high-frequency current (Ip) is fed to the induction heating coil in the heating step S202. In FIG. 9, the horizontal axis represents the shaft impedance (Z: Ω) of the rotating shafts 11, and the vertical axis represents the grid current (Ig: mA). In FIG. 9, measurement data points D1 to D6 are plotted in relation to the six rotating shaft samples. The six measurement data points D1 to D6 are plotted along the straight line 72 and are in a linear relation-ship. Therefore, the grid current Ig can be seen to decrease as the shaft impedance value of the rotating shaft 11 increases, as indicated by the line 72 in FIG. 9.

FIG. 10 is a graph showing the relationship between the grid current Ig and the heating temperature when the magnetostrictive plating part of the rotating shafts 11 is heated. In FIG. 10, the horizontal axis represents the grid current (Ig: mA) and the vertical axis represents the heating temperature (° C.) of the rotating shafts 11.

In FIG. 10, the range of grid currents Ig is divided into six ranges. Also shown is the correlation between the range of numerical values of the grid currents Ig and the ranks 1 to 6 described above. Rank 1 corresponds to a range of about 145.7 to 147.6 mA of grid current, rank 2 corresponds to a range of about 143.8 to 145.7 mA of grid current, rank 3 corresponds to a range of about 142 to 143.8 mA of grid current, rank 4 corresponds to a range of about 140.2 to 142 mA of grid current, rank 5 corresponds to a range of about 138.3 to 140.2 mA of grid current, and rank 6 corresponds to a range of about 136 to 138.3 mA of grid current.

According to the graph in FIG. 10, a large number, 20 or more, of measure-ment data points is plotted. A line 73 can be superimposed based on the large number of measurement data points, and the relationship is a linear. The straight line 73 shown in FIG. 10 indicates an inverse relation whereby the heating temperature decreases as the grid current Ig increases. The relationship with the ranks 1 to 6 is such that the heating temperature decreases as the rank decreases from rank 6 to rank 1.

The following can be concluded from the relationship between the shaft impedance of the rotating shafts 11 and the grid current shown in FIG. 9, and the relationship between the grid current and the heating temperature shown in FIG. 10 are considered; namely, the heating temperature varies in accordance with the difference in the shaft impedance in the relationship between the shaft impedance of the rotating shaft 11 and the heating temperature when the magnetostrictive plating part of the rotating shaft 11 is heated. Specifically, the heating temperature varies depending on the differences in the residual austenite content of the rotating shafts 11, and nonuniformities occur as a result in the above-described sensitivity characteristics of the sensor, even if heating is carried out using the same heat treatment times in process P2. In this step, the magnetostrictive plating parts are heated at a high frequency in the heating step S202, and the magnetostrictive films (14A and 14B) of the rotating shafts 11 are rendered magnetically anisotropic.

The reason that the heating temperature varies depending on the differences in the residual austenite contents of the rotating shafts 11 is described in greater detail below with reference to FIGS. 11A and 11B.

Figure 11A:
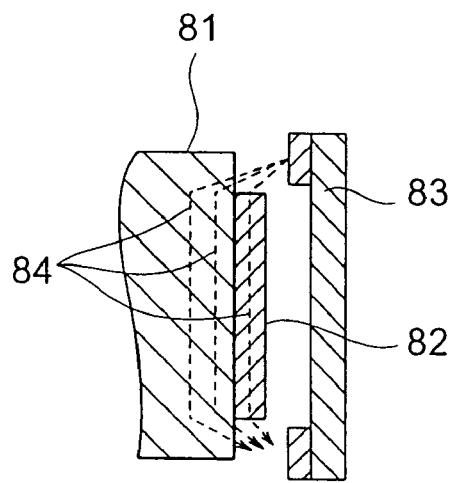
FIGS. 11A and 11B are cross-sectional views showing a magnetic flux distribution when rotating shafts that have different residual austenite contents and are provided with the magnetostrictive plating unit (magnetostrictive film) are heated at a high frequency.
Figure 11B:
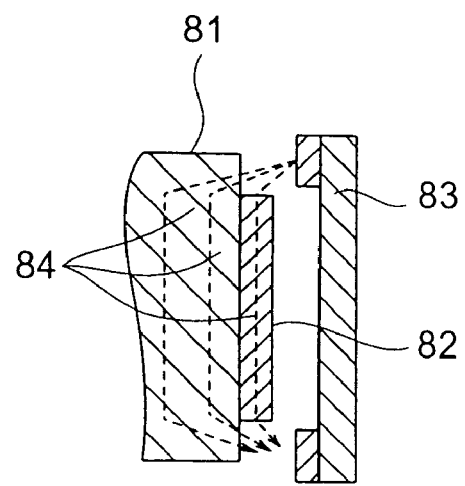

FIGS. 11A and 11B illustrate the distributional state of magnetic flux that penetrates the rotating shafts 11 when the rotating shafts 11 having different residual austenite contents are heated at a high frequency. FIG. 11A shows an example of a rotating shaft 11 (corresponding to rank 6) having a low residual austenite content, and FIG. 11B shows an example of a rotating shaft 11 (corresponding to rank 1) having a high residual austenite content.

In FIGS. 11A and 11B, the numerical symbol 81 shows a portion of the rotating shaft 11, and the numerical symbol 82 shows the magnetostrictive plating part that constitutes the magnetostrictive films 14A and 14B. The numerical symbol 83 shows an induction heating coil. The dotted line 84 shows the distributional state of the magnetic flux. When the residual austenite content is low, the magnetic permeability μ of the rotating shaft 81 is a large value, and the magnetic permeability of the rotating shaft 81 and magnetostrictive plating part 82 is a large value overall, as shown in FIG. 11A. The magnetic flux 84 is thereby prevented from penetrating the interior of the rotating shaft 11, the magnetic flux 84 is concentrated in the magnetostrictive plating part 82 and surface region of the rotating shaft 81, and the density of the magnetic flux in the surface region is increased. For this reason, the high-frequency current Ip increases, the grid current Ig decreases, and the heating temperature in the magnetostrictive plating part increases because of an increase in the eddy current of the magnetostrictive plating part 82. Conversely, when the residual austenite content is high, the magnetic permeability μ of the rotating shaft 81 is a small value, and the magnetic permeability of the rotating shaft 81 and magnetostrictive plating part 82 is a small value overall, as shown in FIG. 11B. The magnetic flux 84 is thereby caused to penetrate the interior rotating shaft 11, the magnetic flux 84 is relatively dispersed in the magnetostrictive plating part 82 and surface region of the rotating shaft 81, and the density of the magnetic flux in the surface region is reduced. For this reason, the high-frequency current Ip is reduced, the grid current Ig is increased, and the heating temperature in the magnetostrictive plating part is reduced because of a reduction in the eddy current in the magnetostrictive plating part 82.

As described above, the heating temperature in the magnetostrictive plating part and other components varies depending on the difference in the residual austenite content of the rotating shaft 11, resulting in nonuniformities in the above-described sensitivity characteristics of the sensor.

In accordance with the method for manufacturing a magnetostrictive torque sensor according to the present example, rotating shafts 11 having different residual austenite contents are ranked (ranks 0 to 6) by measuring the shaft impedances thereof in the residual austenite content measuring process P10, the heat times are set and a heat treatment is carried out in accordance with the rank in the heating step S202 of the magnetic anisotropy imparting process P2, and the heating temperatures of the magnetostrictive plating part on the rotating shafts 11 are thereby made essentially equal, even if the residual austenite content of the rotating shafts 11 is different. As a result, the sensitivity characteristics of the completed magnetostrictive torque sensor 10 are rendered uniform.

In the heating step S202 of the upper-plating high-frequency heating step S21 and lower-plating high-frequency heating step S22 in the magnetic anisotropy imparting process P2, the heat treatment time is extended in cases in which the residual austenite content of the rotating shaft 11 to be treated is high (shaft impedance is high or the rank is closer to 0), the density of the magnetic flux in the magnetostrictive plating part is low, and the temperature does not easily increase. Also, the heat treatment time is shortened in cases in which the residual austenite content of the rotating shafts 11 is low (shaft impedance is low or the rank is closer to 6), the density of the magnetic flux in the magnetostrictive plating part is high, and the temperature easily increases. In practical terms, the heat treatment time is controlled so that the value obtained by integrating the grid current over time is fixed.

As described above, the heat treatment time in the heating step S202 of the magnetic anisotropy imparting process P2 is determined depending on the rank 0 to 6 based on a classification by the differences in the residual austenite content of the delivered rotating shafts 11. In practice, the heat treatment time is determined using the grid current Ig produced in the rotating shafts.

Figure 12:
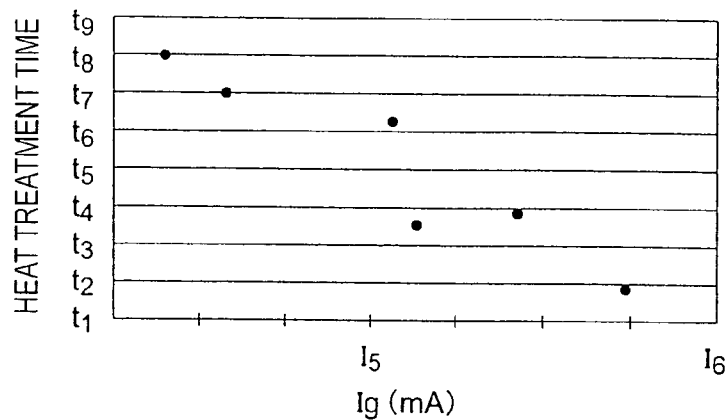
FIG. 12 is a graph showing the relationship between the grid current (Ig) and the heat treatment temperature.

FIG. 12 is a graph showing the relationship between the grid current (Ig) and the heat treatment temperature for the rotating shafts related to the six samples. In FIG. 12, the horizontal axis represents the grid current Ig (mA), and the horizontal axis represents the heat treatment time (seconds). It is apparent that the heat treatment time is extended as the grid current Ig in the six samples is reduced.

Figure 13:
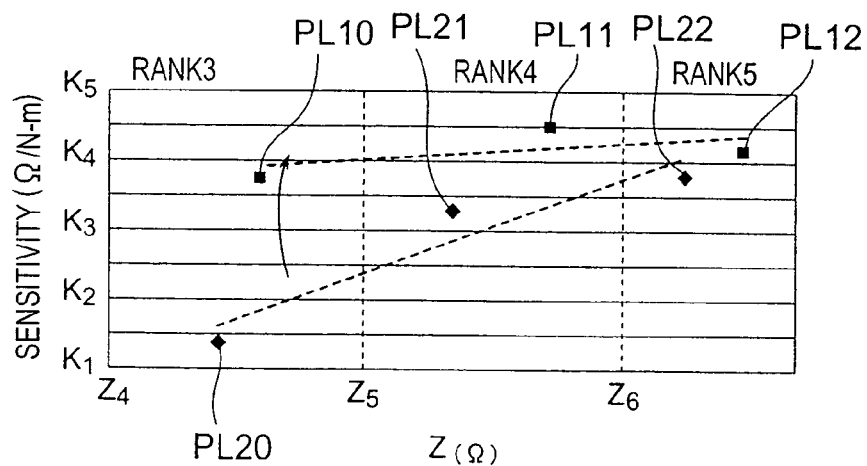
FIG. 13 is a graph showing the sensitivity (Z slope) of the magnetostrictive torque sensor formed on rotating shafts having different shaft impedances.
Figure 14:
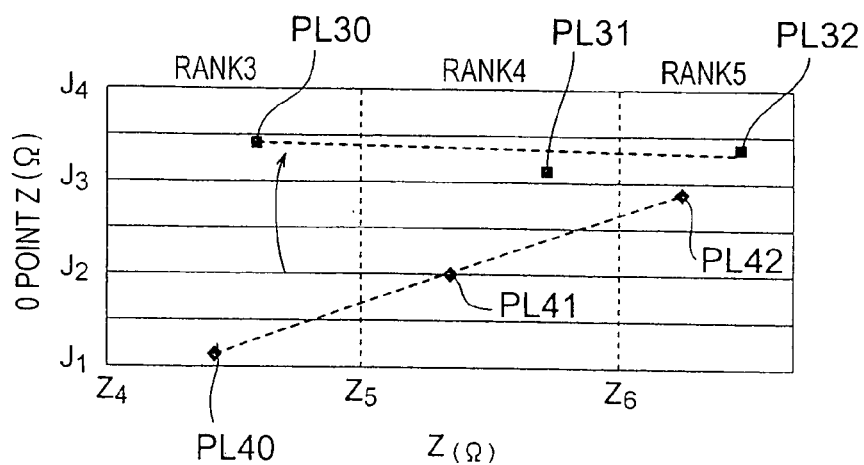
FIG. 14 is a graph showing the 0 point Z of the magnetostrictive torque sensor formed on rotating shafts having different shaft impedances.

Next, shown in FIGS. 13 and 14 are the test results of the characteristics of the magnetostrictive torque sensor 10 manufactured by the method of manufacturing a magnetostrictive torque sensor according to the present example.

FIG. 13 shows the "sensitivity" of a magnetostrictive torque sensor formed on rotating shafts having different shaft impedances (residual austenite contents). The sensitivity represents the amount of variation in shaft impedance per 1 N·m of input torque in the input torque impedance characteristics (corresponding to the characteristics 51A and 51B shown in FIG. 4) of the magnetostrictive torque sensor 10, for example.

In FIG. 13, the horizontal axis represents the shaft impedance of the rotating shaft, and the vertical axis represents the sensitivity of the magnetostrictive torque sensor formed on each of the rotating shaft. The plotted points PL10, PL11, and PL12 represent the sensitivity of the magnetostrictive torque sensor 10 manufactured by the method of manufacturing according to the present example, and the plotted points PL20, PL21, and PL22 represent the sensitivity of a magnetostrictive torque sensor manufactured by a conventional manufacturing method.

It is apparent that the sensitivity of the magnetostrictive torque sensors manufactured using the method of manufacturing of the present example remains substantially constant without dependence on the shaft impedance of the rotating shafts 11, in contrast to a conventional manufacturing method, wherein the sensitivity of the magnetostrictive torque sensor formed on rotating shafts having different shaft impedances varies in accordance with the difference in the shaft impedances.

FIG. 14 shows the "0 point Z" of the magnetostrictive torque sensor formed on rotating shafts having different shaft impedances (residual austenite contents). The "0 point Z" is the shaft impedance value when the input torque is 0 on the Z reference line. In FIG. 14, the horizontal axis represents the shaft impedance of the rotating shafts, and the horizontal axis represents the 0 point Z of the magnetostrictive torque sensor formed on the rotating shafts. The plotted points PL30, PL31, and PL32 represent the 0 point Z of the magnetostrictive torque sensors 10 manufactured using the method of manufacturing of the present example, and the plotted points PL40, PL41, and PL42 represent the 0 point Z of the magnetostrictive torque sensors manufactured using the a conventional manufacturing method. It is apparent that the 0 point Z of the magnetostrictive torque sensors manufactured using the method of manufacturing of the present example remains substantially constant without dependence on the shaft impedance of the rotating shafts, in contrast to a conventional manufacturing method, wherein the O point Z of the magnetostrictive torque sensor fabricated on rotating shafts having different shaft impedances varies in accordance with the difference in the shaft impedances.

As described above, in accordance with the present invention, non-uniformities in the output characteristics of a magnetostrictive torque sensor can be reduced by easily controlling the heat treatment time using conventional delivered rotating shafts 11 without modifying the heating device used in any particular way.

The present invention is a method for manufacturing a magnetostrictive torque sensor that is used as a steering torque sensor in an electrically powered steering apparatus or the like, and is used as a manufacturing method that produces minimal nonuniformity in the sensitivity characteristics of the sensor.

Obviously, various minor changes and modifications of the present invention are possible in light of the above teaching. It is therefore to be understood that within the scope of the appended claims the invention may be practice otherwise than as specifically described.

What is claimed is:

1. A method of manufacturing a magnetostrictive torque sensor, comprising:
    measuring a residual austenite content of a rotating shaft, including a portion of the rotating shaft on which a magnetostrictive plating part is to be formed, prior to the magnetostrictive plating part being formed on the portion of the rotating shaft, wherein the residual austenite content of the rotating shaft varies throughout the rotating shaft as a result of a manufacturing process of the rotating shaft;
    forming the magnetostrictive plating part on the portion of the rotating shaft;
    imparting magnetic anisotropy to the magnetostrictive plating part to form a magnetostrictive film by providing heat-treatment conditions to the rotating shaft and the magnetostrictive plating part that correspond to measurement information obtained while measuring the residual austenite content of the rotating shaft;
    wherein providing the heat-treatment conditions comprises:
        heat-treating the rotating shaft based upon a heat-treatment time that corresponds to the residual austenite content measured while measuring the residual austenite content, and
        heat-treating the rotating shaft in a state in which a prescribed twisting torque is applied to the rotating shaft; and
    wherein providing the heat-treatment conditions also comprises:
        heat-treating the magnetostrictive plating part of the rotating shaft with an induction heating coil, and
        controlling the heat-treatment time so that a value obtained by integrating a grid current over time is fixed, wherein the grid current is an electric current that is inversely proportional to an eddy current generated in the magnetostrictive plating part and the rotating shaft when a high-frequency current is supplied to the induction heating coil.

2. The method of claim 1, wherein measuring the residual austenite content comprises:
    disposing a sensing coil around the rotating shaft;
    supplying alternating current to the sensing coil to excite the sensing coil;
    indirectly measuring a shaft impedance of the rotating shaft by means of the sensing coil; and
    calculating the residual austenite content of the rotating shaft based on the measured shaft impedance.

* * * * *